United States Patent [19]

Agiman

[11] Patent Number: 5,514,977
[45] Date of Patent: May 7, 1996

[54] PULSE DETECTION AND CONDITIONING CIRCUIT

[75] Inventor: Dan Agiman, Mission Viejo, Calif.

[73] Assignee: Linfinity Microelectronics, Inc., Garden Grove, Calif.

[21] Appl. No.: 254,660

[22] Filed: Jun. 3, 1994

Related U.S. Application Data

[63] Continuation of Ser. No. 937,474, Aug. 28, 1992, abandoned.

[51] Int. Cl.$^6$ .................................................. G01R 31/34
[52] U.S. Cl. ...................... 324/772; 318/254; 340/648; 324/510
[58] Field of Search ................................ 318/254, 138, 318/439; 324/772

[56] References Cited

U.S. PATENT DOCUMENTS

| | | | |
|---|---|---|---|
| 3,708,737 | 1/1973 | Johnson | 318/636 |
| 5,023,527 | 6/1991 | Erdman et al. | 318/254 |
| 5,202,620 | 4/1993 | Kawamura | 324/772 |
| 5,231,338 | 7/1993 | Bulgarelli et al. | 318/254 |

*Primary Examiner*—Kenneth A. Wieder
*Assistant Examiner*—Barry C. Bowser
*Attorney, Agent, or Firm*—Loeb and Loeb

[57] ABSTRACT

A pulse detection and conditioning circuit senses and conditions commutation pulses produced by a DC permanent magnet motor to determine motor position. The pulses are sensed using a resistor coupled in series with the motor, so that motor current and the included pulses are continuously sensed, even during motor braking. The serially coupled resistor also provides for sensing and conditioning of pulses of both polarities produced by bi-directional operation of the motor. The pulse detecting and conditioning is performed by circuitry which performs amplitude qualification as well as frequency filtering to effectively detect valid commutation pulses to the exclusion of noise and other unwanted signals. Capacitors coupled to the motor and internal capacitors provide the frequency filtering, while the amplitude qualification is provided by a balanced differential gain stage coupled through an adjustable differential gain stage with adjustable gain to a unity gain comparator. The adjustable gain of the adjustable differential gain stage and a variable reference voltage within the unity gain comparator provide for adjustable amplitude qualification. A differential to single ended converter responsive to the outputs of the unity gain comparator feeds a threshold latch to initiate the generation of a pulse representing each valid motor pulse.

54 Claims, 4 Drawing Sheets

PULSE DETECTION AND CONDITIONING CIRCUIT

This is a continuation of application Ser. No. 07/937,474 filed on Aug. 28, 1992, now abandoned.

BACKGROUND OF THE INVENTION

1. Field of the Invention

The present invention relates to apparatus for determining the rotational position of a motor, and more particularly to apparatus of the type which determines the rotational position of a DC permanent magnet motor by counting commutation pulses.

2. History of the Prior Art

It is frequently necessary to track the position of a motor in feedback, servo or similar systems. In automotive air conditioning systems, for example, a DC permanent magnet motor is typically used to drive a ventilation door. The position of the ventilation door is determined by tracking the position of the drive motor.

An early approach to tracking motor position involved the use of mechanical components such as potentiometers built into an attenuator gear train. A window comparator was activated to force the desired actuator position. Such mechanical systems were subject to inaccuracies, wear and premature failure.

More recently, motor position has been tracked by detecting and counting commutation pulses. In the case of a DC permanent magnet motor, as the motor rotates, the current is periodically interrupted due to the action of the motor brushes. This produces a steep pulse or spike in the motor current. Such commutation pulses are detected and counted using a microprocessor to provide an indication of motor position. The pulses have a very short duration, typically about 50 nanoseconds, so as to be distinguishable from other pulses and variations in motor current through the use of filtering techniques.

Arrangements for tracking motor position by counting commutation pulses typically include circuitry for detecting the pulses and then conditioning the pulses such as by amplification and filtering so that valid commutation pulses can be detected to the exclusion of noise and other unwanted signals. In one particular prior art circuit, for example, the motor is coupled through an inverter to convert the negative pulses into positive pulses before application to a filter and amplifier for high pass filtering and amplification. The output of the filter and amplifier is a series of pulses which are counted by a pulse counter such as a microprocessor. The motor is coupled to be driven by a motor drive circuit, which is coupled to ground through a sense resistor.

Pulse counting circuits of the type described have a number of disadvantages. One problem occurs during motor braking. In that mode, the motor current tends to circulate through the motor drive circuit to the exclusion of the sense resistor, so that commutation pulses may not be detected. Also, the filtering and amplification process is such that the high gain amplification of detected pulses frequently results in false detection. A major problem in such systems is to distinguish between valid motor commutation pulses and noise or lower amplitude pulses common with aging motors. The circuit must be capable of detecting commutation pulses of varying shapes and amplitudes, to the exclusion of noise and other unwanted pulses which may not differ substantially from the commutation pulses. Variations in the commutation pulses tend to increase as the motor ages, making the accurate detection of the commutation pulses even more difficult. A further problem relates to the fact that such pulse detection and conditioning circuits are only capable of detecting pulses of one polarity. For bi-directional motor operation, two such circuits are needed in order to sense the pulses of opposite polarity. The circuits themselves are relatively inefficient, and typically require a large number of components to implement.

It would therefore be desirable to provide an improved arrangement for tracking motor position. It would furthermore be desirable to provide an improved motor tracking arrangement which provides for the accurate detection of commutation pulses during motor braking as well as at other times when noise and other unwanted signals are present. It would still further be desirable to provide a motor tracking circuit capable of sensing pulses of opposite polarity for bi-directional motor operation.

BRIEF SUMMARY OF THE INVENTION

Motor tracking arrangements in accordance with the invention employ pulse detecting and conditioning circuitry which continuously monitors motor current, even during motor braking. This may be accomplished by coupling the sense resistor in series with the motor in order to sense the motor current even during braking when the current tends to circulate through the loop comprised of the motor and the coupled drive circuit. Coupling of the sense resistor in series with the motor also enables a single pulse sensing and conditioning circuit to respond to motor pulses of either polarity. The pulse detecting and conditioning circuitry provides amplitude qualification in addition to frequency filtering in order to better distinguish motor pulses from noise and other unwanted signals. The amplitude qualification is accomplished using balanced differential amplifiers, and is made adjustable through variable gain.

In a preferred arrangement of a pulse detection and conditioning circuit in accordance with the invention, the motor is coupled in series with the sense resistor across the opposite terminals of the motor drive circuit, so that the sense resistor can be used to sense motor current at all times, even during braking. Such arrangement also enables motor pulses of opposite polarity to be sensed. A junction between the serial combination of the motor and the sense resistor is coupled to the input of a balanced differential gain stage through a first capacitor which provides high pass filtering of the motor sense voltage. The junction is also coupled to the balanced differential gain stage through a coupling resistor. A second capacitor coupled in parallel with the motor provides low pass filtering.

The balanced differential gain stage which is coupled to a balanced DC bias voltage arrangement becomes unbalanced whenever a motor pulse is applied thereto. The resulting current differential is provided to an adjustable differential gain stage to produce a differential output voltage which varies in response to the differential current of the balanced differential gain stage in a ratio determined by adjustable gain. The adjustable gain determines the amplitude qualification, in combination with a variable reference voltage within a unity gain comparator to which the output of the adjustable differential gain stage is coupled. The unity gain comparator determines when either of the differential outputs of the adjustable differential gain stage increases above a threshold value to signal the receipt of a valid motor pulse.

The balanced differential gain stage may comprise a differential amplifier having a pair of transistors coupled to balanced DC bias voltages. This produces the flow of equal currents through the transistors, except when the bias on one of the transistors is changed by the presence of a motor pulse. The resulting current differential is applied to produce a difference in the outputs of a pair of transistors within the adjustable differential gain stage. The pair of transistors is coupled through resistors to provide the adjustable gain. The transistor outputs are coupled to control the biasing of a pair of transistors within the unity gain comparator. The transistor outputs are compared with a threshold value, and receipt of a valid motor pulse is signaled when the threshold value is exceeded.

The outputs of the pair of transistors in the unity gain comparator and the threshold value thereof are applied to a differential to single ended converter comprising an amplifier having an output coupled to one of a pair of inputs of a comparator. The other input of the comparator is provided by a reference voltage. The comparator feeds a latch, causing the latch to be set when the outputs of the pair of transistors of the unity gain comparator exceed the threshold value. Setting of the latch provides discharge of a capacitor within a one shot to produce the leading edge of a pulse representing a valid motor pulse.

BRIEF DESCRIPTION OF THE DRAWINGS

A better understanding of the invention may be had by reference to the following detailed description taken in conjunction with the accompanying drawings, in which.

DETAILED DESCRIPTION

Figure 1:
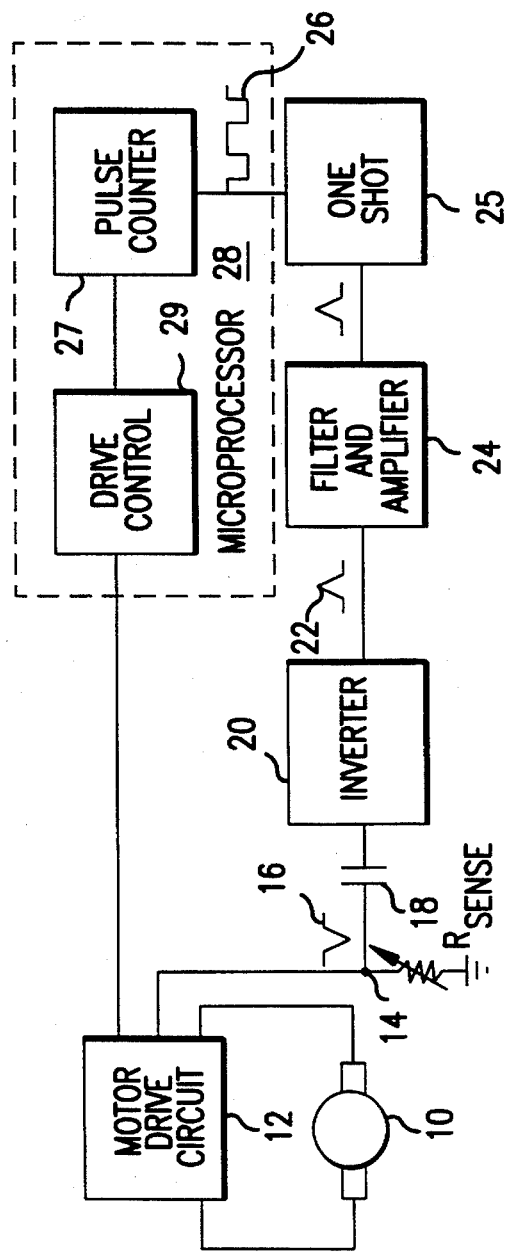
FIG. 1 is a block diagram of a prior art arrangement for tracking motor position.

FIG. 1 shows a prior art arrangement for tracking the position of a motor 10 by counting commutation pulses produced by the motor 10. The motor 10 is coupled to be driven by a motor drive circuit 12 which is typically a balanced bridge circuit having opposite pairs of transistors across which the motor 10 is coupled. One of the pairs of transistors of the motor drive circuit 12 is coupled to ground through a terminal 14 and a sense resistor $R_{sense}$. The resistor $R_{sense}$, which may be variable, provides monitoring of the motor current. The motor current includes a periodic commutation pulse, which in the present example is negative for a given direction of motor rotation. One such negative motor commutation pulse 16 is shown in FIG. 1.

The terminal 14 is coupled through a capacitor 18 to an inverter 20, where the motor pulses are inverted to provide positive pulses. One such positive pulse 22 is shown at the output of the inverter 20. The positive pulses 22 at the output of the inverter 20 are passed to a filter and amplifier 24 for filtering and amplification. The filtering separates the motor pulses from other motor current signals based on their known frequency band. The amplification facilitates the detection of motor pulses of relatively low amplitude, and is accomplished using a high gain amplification stage. The pulses as filtered and amplified by the filter and amplifier 24 are applied to a one shot 25 for conversion into a train of square wave pulses 26. The pulses 26 are counted by a pulse counter 27 within a microprocessor 28. A drive control 29 within the microprocessor 28 responds to the pulse count determined by the pulse counter 27 to drive the motor 10 via the motor drive circuit 12, thereby completing a feedback loop to the motor 10.

Figure 2:
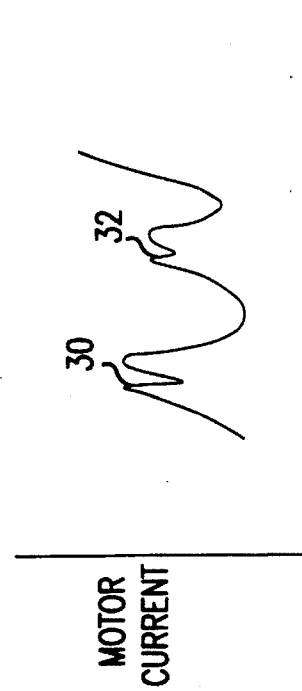
FIG. 2 is a graph of motor current as a function of time.

A typical segment of motor current for the motor 10 over a period of time is shown in FIG. 2. The motor current has a continually varying waveform as shown. However, because the motor 10 is a DC permanent magnet motor, the current is periodically interrupted momentarily due to the action of the motor brushes. Such interruption results in a relatively steep pulse or spike in the motor current, with two such pulses 30 and 32 being shown in FIG. 2. The motor 10 produces a fixed number of the commutation pulses, such as the pulses 30 and 32, for each revolution thereof. For this reason, counting of the commutation pulses provides a representation of the rotational position of the motor 10.

As shown in FIG. 2, the pulses 30 and 32 comprise relatively steep spikes so as to have a high frequency. By frequency filtering, such as through use of the filter and amplifier 24 of the arrangement of FIG. 1, the high frequency pulses 30 and 32 are detected within the filtering frequency range to the exclusion of other pulses and variations in the motor current which are not commutation pulses. Typically, the motor pulses such as the pulses 30 and 32 have a duration of about 50 nanoseconds. By amplifying the motor current, such as through use of the filter and amplifier 24 of the arrangement of FIG. 1, motor pulses of relatively low amplitude can be detected. As shown in FIG. 2, the motor pulses vary somewhat in size and duration. Such variations become even more pronounced as the motor ages. This make the task of detecting valid motor pulses to the exclusion of noise and other unwanted signals even more difficult.

Motor tracking arrangements of the type shown in FIG. 1 have a number of disadvantages. One such disadvantage relates to the difficulty in sensing valid motor pulses during motor braking. During braking, the motor current tends to circulate within the loop comprised of the motor 10 and the motor drive circuit 12, with the result that sensing of the motor current pulses at the sense resistor $R_{sense}$ becomes quite difficult. Consequently, the arrangement frequently fails to detect valid motor pulses.

A further disadvantage of the arrangement shown in FIG. 1 relates to the difficulty in discriminating between valid motor pulses and unwanted noise. Typically, the amplifying section of the filter and amplifier 24 is placed at a high gain setting so that motor pulses of relatively low amplitude can be detected. This often results in noise and other unwanted signals being detected erroneously.

A further disadvantage of the arrangement shown in FIG. 1 relates to the inability of the circuitry to respond to other than motor pulses of a particular polarity. For bi-directional motor operation where pulses of opposite polarity are produced, two such circuits must be provided. Moreover, the circuit itself is not very efficient and requires a large number of components to implement.

Figure 3:
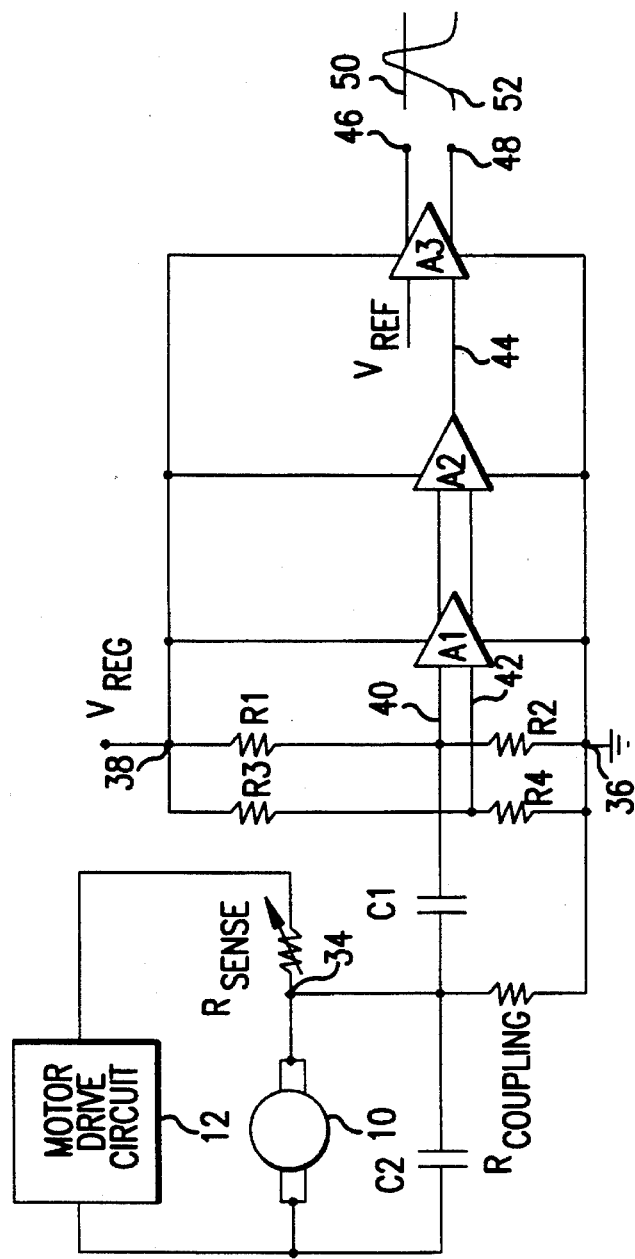
FIG. 3 is a diagram, partially in block form and partially in schematic form, of a motor position tracking arrangement which includes a pulse detection and conditioning circuit according to the invention.

FIG. 3 shows a preferred embodiment of an arrangement for detecting motor pulses in accordance with the invention. In the arrangement of FIG. 3, the sensing resister $R_{sense}$ is serially coupled with the motor 10 through a junction 34.

The serial combination of the motor 10 and the sensing resistor $R_{sense}$ is coupled across the motor drive circuit 12. The junction 34 is coupled to an input of a balanced differential gain stage A1 through a capacitor C1. The junction 34 is also coupled to the balanced differential gain stage A1 through a coupling resistor $R_{coupling}$. A second capacitor C2 is coupled in parallel with the motor 10.

Pulses from the motor 10 are provided by the junction 34 to the input of the balanced differential gain stage A1 through the capacitor C1. The capacitor C1 AC couples the pulses to the balanced differential gain stage A1 so as to provide high pass filtering. At the same time, the capacitor C2 provides low pass filtering. The capacitors C1 and C2 therefore define the frequency range in which valid motor pulses occur. Pulses having a frequency outside of the range are excluded.

The sensing resistor $R_{sense}$ continuously monitors the motor current so that the motor pulses are passed by the capacitor C1 to the input of the balanced differential gain stage A1. By placing $R_{sense}$ in series with the motor 10, the motor current is continuously monitored. Even during motor braking, when the current tends to be confined to the loop formed by the motor 10 and the motor drive circuit 12, such loop includes $R_{sense}$ so that the motor pulses continue to be detected.

A further advantage in placing the sensing resistor $R_{sense}$ in series with the motor 10 stems from the ability of such circuit to sense motor pulses of either polarity. The motor 10 generates pulses of a first polarity when driven in a first direction and pulses of an opposite second polarity when driven in the reverse direction. However, the circuit of FIG. 3, with the sense resistor coupled in series with the motor 10, is capable of detecting motor pulses of either polarity. This enables the single pulse detection and conditioning circuit within the arrangement of FIG. 3 to be used for bi-directional motor operation in which pulses of either polarity may be produced.

The balanced differential gain stage A1 is coupled between a grounded terminal 36 and an opposite terminal 38 at which a regulated voltage $V_{reg}$ is applied. Balanced DC biasing is provided by such arrangement in combination with a network of resistors comprising R1, R2, R3 and R4. A first input 40 of the balanced differential gain stage A1 which is coupled to the junction 34 through the capacitor C1 is also coupled to the terminal 38 through the resistor R1 and to the terminal 36 through the resistor R2. A second input 42 of the balanced differential gain stage A1 is coupled to the terminal 38 through the resistor R3 and to the terminal 36 through the resistor R4. The resistors R1, R2, R3 and R4 maintain the balanced differential gain stage A1 in a balanced state except when a motor pulse appears at the input 40, as described in detail hereafter. When such a motor pulse appears, the balanced differential gain stage A1 becomes unbalanced so as to unbalance or differentially bias an adjustable differential gain stage A2. The stage A2 provides a differential output voltage in response to a current differential therein and in accordance with a voltage gain determined by the ratio of resistors within the stage A2 and within a differential gain stage thereof. The result is applied to an input 44 of a unity gain comparator A3.

The unity gain comparator A3 has a pair of outputs 46 and 48. A constant threshold value appears at the output 46, as represented by a line 50 shown at the right hand edge of FIG. 3. A variable signal at the output 48 represents the differential output voltage of the adjustable differential gain stage A2 as influenced by the adjustable gain circuit therein and by an adjustable reference voltage $V_{ref}$ applied to the unity gain comparator A3 to adjust the threshold level at the output 46. The signal at the output 48 is represented by a line 52 at the right hand edge of FIG. 3.

When a commutation pulse from the motor 10 appears at the input 40 of the balanced differential gain stage A1, the gain stage A1 responds in conjunction with the balanced gain stage A2 and the unity gain comparator A3 to produce a rise in the signal at the output 48 of the unity gain comparator A3 as shown by the line 52 in FIG. 3. The gain stages A1 and A2 and the comparator A3 provide amplitude qualification of the motor pulses through the adjustable gain circuit within the gain stage A2 and the variable reference voltage $V_{ref}$ at the unity gain comparator A3. These variable factors determine the minimum amplitude necessary for a pulse to be declared a valid motor pulse and not noise or other unwanted signals. Pulses of minimum acceptable amplitude produce a signal at the output 48 which momentarily exceeds the threshold signal at the output 46, as shown by the lines 50 and 52 in FIG. 3. When the line 52 crosses above the line 50, this is interpreted as a valid motor pulse by the circuit in FIGS. 5 and 6 described hereafter, so as to result in the sending of a pulse to a microprocessor or other pulse counter device. Pulses of less than the minimum acceptable amplitude result in a signal at the output 48 which does not rise to the level of the output 46. Normally, the reference voltage $V_{ref}$ is adjusted initially, and thereafter is allowed to remain at the selected value. The adjustable gain circuit within the adjustable differential gain stage A2 thereafter functions in combination with the unity gain comparator A3 to provide amplitude qualification. As previously described, the capacitors C1 and C2 provide high pass and low pass filtering respectively.

Figure 4:
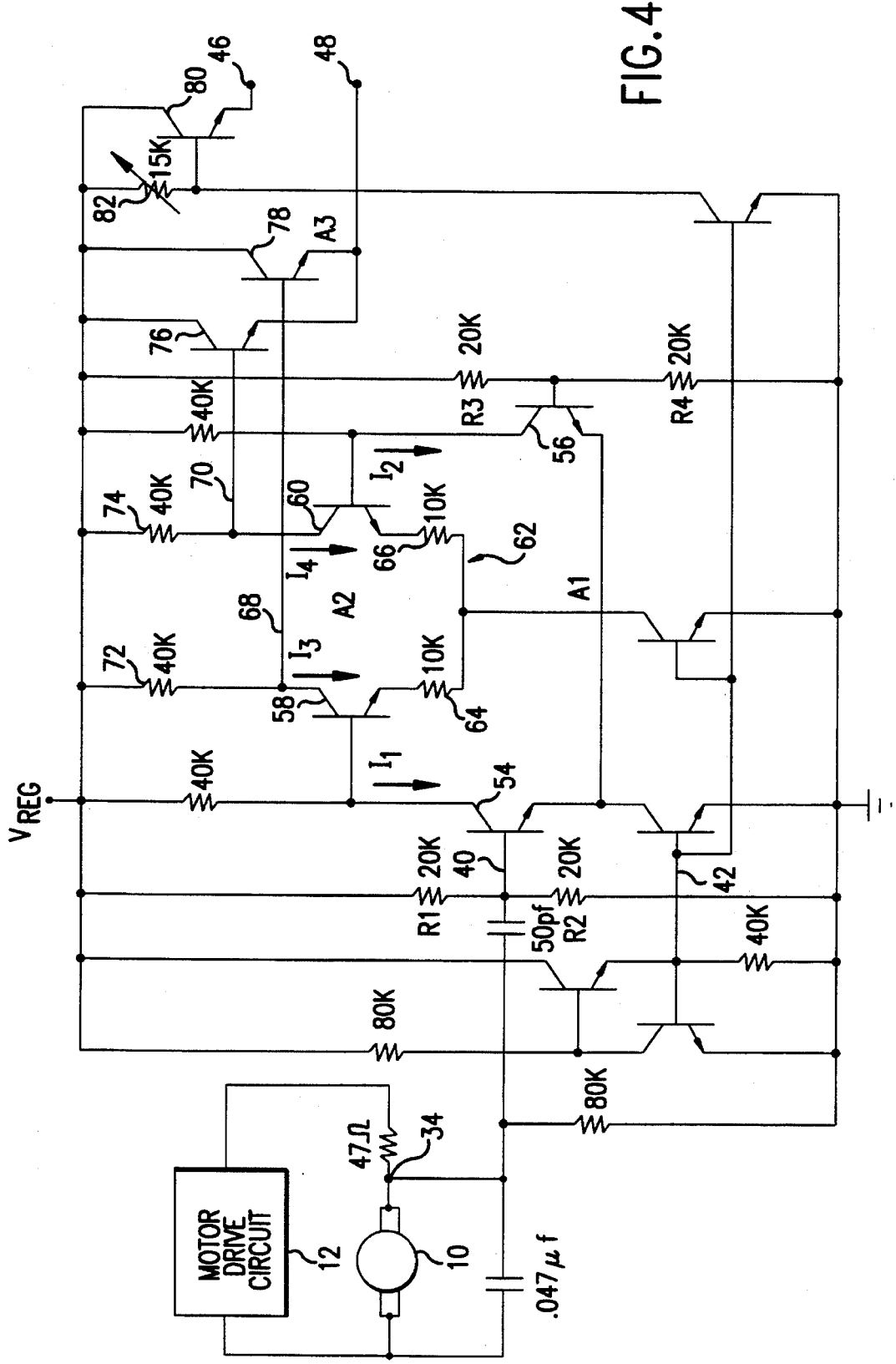
FIG. 4 is a detailed schematic diagram of the arrangement of FIG. 3.

A detailed example of the arrangement of FIG. 3 is shown in FIG. 4. As shown in FIG. 4, the sensing resistor $R_{sense}$ has a value of 47 ohms. However, the sensing resistor $R_{sense}$ may be variable, as shown in FIG. 3, and may be adjusted to values other than 47 ohms as the situation may require. The capacitor C1 has a value of 50 picofarads and the capacitor C2 has a value of 0.047 microfarads.

In the arrangement of FIG. 4, the balanced differential gain stage A1 is comprised principally of a differential amplifier having transistors 54 and 56. The transistors 54 and 56 are normally maintained in a balanced state by a balanced biasing voltage arrangement which includes the resistors R1, R2, R3 and R4 shown in FIG. 3. In the arrangement of FIG. 4, the resistors R1, R2, R3 and R4 each have a value of 20K ohms.

As shown in FIG. 4, a current $I_1$ flows through the transistor 54 and a current $I_2$ flows through the transistor 56. The currents $I_1$ and $I_2$ determine the biasing voltages at the bases of a pair of transistors 58 and 60, respectively, which transistors 58 and 60 comprise a differential amplifier within the adjustable differential gain stage A2. The transistor 58 has a current $I_3$ flowing therethrough, while the transistor 60 has a current $I_4$ flowing therethrough. The biasing voltages at the bases of the transistors 58 and 60 provided by $I_1$ and $I_2$ determine the currents $I_3$ and $I_4$.

Normally, the balanced DC bias provided to the transistors 54 and 56 causes the currents $I_1$ and $I_2$ to be equal. This results in equal biasing of the transistors 58 and 60, so that the currents $I_3$ and $I_4$ are also equal. However when a motor pulse appears at the input 40 comprising the base of the transistor 54, the bias on the transistor 54 changes. Depending upon the polarity of the pulse, the bias on the transistor 54 is either increased or decreased. Pulses of one polarity which increase the bias on the transistor 54 result in an increase in the current $I_1$ by a given amount and a decrease in the current $I_2$ by the given amount. Conversely, pulses of opposite polarity reduce the bias on the transistor 54, with the result that the current $I_1$ decreases by a certain amount and the current $I_2$ increases by a like amount. Such changes in the currents $I_1$ and $I_2$ affect the biasing of the transistors 58 and 60 and thus the currents $I_3$ and $I_4$ flowing therethrough.

Therefore, a pulse at the input 40 which increases the bias on the transistor 54 increases the current $I_1$. This increases the bias on the transistor 58 and thereby the current $I_3$. At the same time, a corresponding decrease in the current $I_2$ decreases the bias on the transistor 60 so as to decrease the current $I_4$. A pulse of polarity which decreases the current $I_1$ and increases the current $I_2$ will produce a decrease in the current $I_3$ and an increase in the current $I_4$. In this fashion, a differential in the biasing of the transistors 54 and 56 of the balanced differential gain stage A1 produces a corresponding change in the biasing of the transistors 58 and 60 in the adjustable differential gain stage A2.

The transistors 58 and 60 within the adjustable differential gain stage A2 are coupled through an adjustable gain circuit 62 which includes resistors 64 and 72 and 66 and 74 which are coupled to the transistors 58 and 60 respectively. Leads 68 and 70 are coupled to the transistors 58 and 60 opposite the resistors 64 and 66 respectively. The lead 68 is also coupled to a resistor 72, while the lead 70 is coupled to a resistor 74.

A difference in the currents $I_3$ and $I_4$ produces a differential output voltage between the leads 68 and 70. The differential output voltage is also affected by the voltage gain of the stage A2. The voltage gain is determined by the ratio of the resistor 72 to the resistor 64 and the ratio of the resistor 74 to the resistor 66. Thus, the adjustable gain circuit 62 adjusts the differential small signal voltage gain between the currents $I_3$ and $I_4$ which results from a given biasing differential at the balanced differential gain stage A1. This in turn determines the biasing voltages on the pair of leads 68 and 70.

The leads 68 and 70 are coupled to the bases of a pair of transistors 76 and 78 within the unity gain amplifier A3. Each of the transistors 76 and 78 is coupled to the output 48. The output 46 is coupled to a transistor 80 in combination with a variable resistor 82. The variable resistor 82 provides the reference voltage $V_{ref}$ to the unity gain comparator A3. The reference voltage $V_{ref}$ adjusts the value of the threshold signal at the output 46.

As previously described, a motor pulse at the input 40 results in an imbalance in the currents $I_1$ and $I_2$ which in turn produces a difference in the currents $I_3$ and $I_4$, so that a biasing differential exists between the leads 68 and 70. In this fashion, the amplitude of the pulse determines the bias voltage on one of the leads 68 and 70 and thereby the amplitude of the resulting signal at the output 48 produced by a corresponding one of the transistors 76 and 78. The polarity of the motor pulse at the input 40 determines whether the resulting high bias voltage appears at the lead 68 or the lead 70. In either event one of the transistors 76 and 78 produces a signal at the output 48 which corresponds to the amplitude of the motor pulse at the input 40. As shown by the line 52 in FIG. 3, such signal at the output 48 rises and then falls in correspondence with the pulse at the input 40. If the line 52 rises above the line 50, then a valid motor pulse is present. Otherwise, the pulse at the input 40 is assumed to be noise or another unwanted signal, and no output pulse is produced by the outputs 46 and 48.

Figure 5:
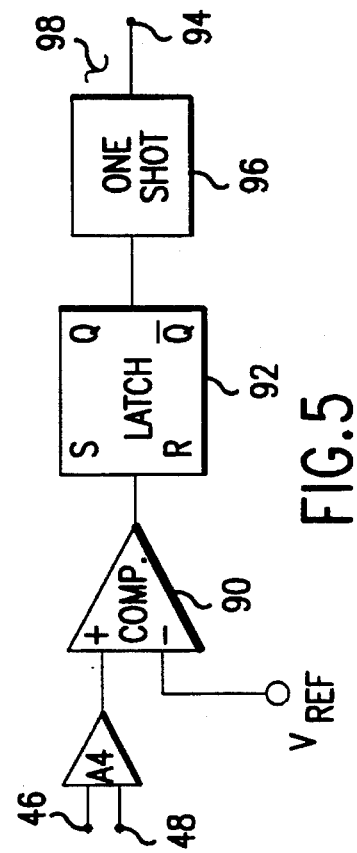
FIG. 5 is a block diagram of a differential to single ended convertor and threshold latch arrangement for use with the arrangement of FIGS. 3 and 4.

FIG. 5 provides an example of an arrangement for generating pulses in response to the signals at the outputs 46 and 48 of the arrangement of FIG. 3. As shown in FIG. 5, the outputs 46 and 48 are coupled to the inputs of an amplifier A4 having a single output coupled to the positive input of a comparator 90. The comparator 90 has a negative input coupled to receive a reference voltage $V_{ref}$. The output of the comparator 9 is coupled to the set (S) input of a latch 92. The Q output of the latch 92 is coupled to an output terminal 94 through a one shot 96. As described in detail hereafter, the circuit of FIG. 5 generates the leading edge 98 of a pulse at the output terminal 94 in response to a valid motor pulse which causes the signal 52 at the output 48 to rise above the signal 50 at the output 46.

The amplifier A4 of the circuit of FIG. 5 functions as a differential to single ended converter to provide a single signal to the positive input of the comparator 90 in response to the difference between or relative values of the signals at the outputs 46 and 48. As described in detail hereafter in connection with the example of FIG. 6, a pair of resistors within equal current paths in the amplifier A4 are unequal in value by an amount which turns on the comparator 90 when the signal 52 at the output 48 rises to a value slightly greater than the value of the signal 50 at the output 46. This corresponds to the output of the amplifier A4 exceeding $V_{ref}$ to turn on the comparator 90 and set the latch 92, in threshold latching fashion, so that the pulse leading edge 98 is generated. The pulse leading edge 98 is generated by the discharge of a capacitor within the one shot 96 as described hereafter in the example of FIG. 6.

Figure 6:
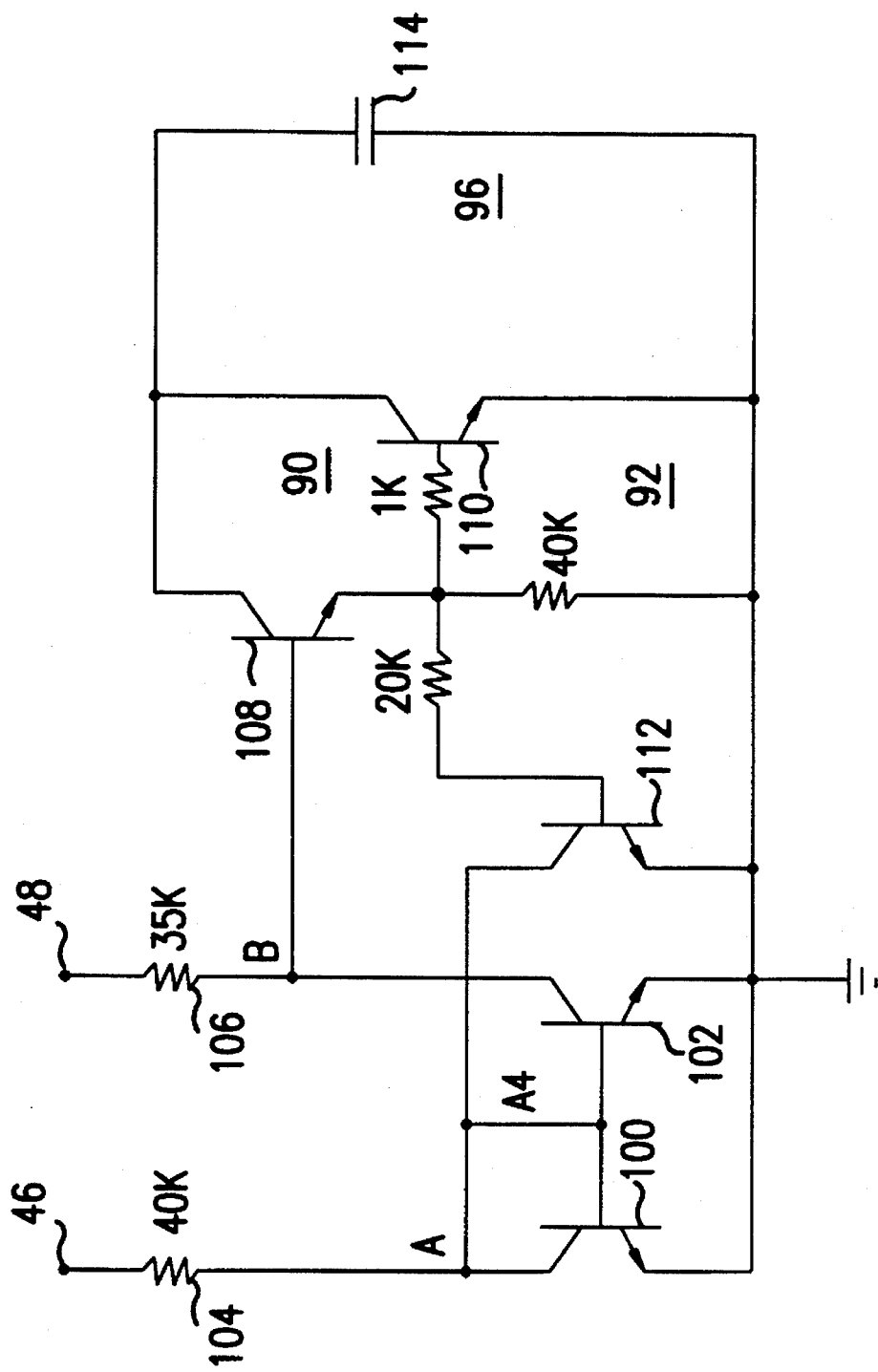
FIG. 6 is a detailed schematic diagram of the arrangement of FIG. 5.

Referring to the detailed example of FIG. 6, the amplifier A4 includes a pair of transistors 100 and 102. The transistor 100 is coupled between the output 46 and ground though a 40K ohm resistor 104. The transistor 102 is coupled between the output 48 and ground through a 35K ohm resistor 106. The transistors 100 and 102 are coupled in a manner which provides essentially equal currents therethrough independent of the voltages at the outputs 46 and 48. The collector of the transistor 100 is coupled to a terminal A having a voltage which follows the voltage at the output 46. The collector of the transistor 102 is coupled to a terminal B having a voltage determined by the voltage at the output 48.

As previously described in connection with FIG. 3, the signal 50 at the output 46 remains constant while the signal 52 at the output 48 varies in response to the receipt of motor pulses. Because the value of the resistor 106 is somewhat less than the value of the resistor 104, a smaller voltage drop occurs across the resistor 106 as compared with the voltage drop across the resistor 104 for equal voltages at the outputs 46 and 48. Therefore, equal voltages at the outputs 46 and 48 produce a voltage at terminal B which is slightly higher than the voltage at terminal A. In the absence of a motor pulse, the voltage at the output 48 is substantially less than the voltage at the output 46, so that the voltage at terminal B is less than the voltage at terminal A. Such relatively low voltages at the terminal B are insufficient to bias a transistor 108 within the comparator 90 into conduction.

When the signal 52 at the output 48 rises to a value approximately equal to the signal 50 at the output 46, in response to receipt of a motor pulse, the equal voltages at the outputs 46 and 48 produce a voltage at terminal B which is slightly greater than the voltage at terminal A due to the different values of the resistors 104 and 106. The resulting voltage at terminal B is large enough to bias the transistor 108 into conduction, and turns on a transistor 110. The turning on of the transistors 108 and 110 biases into conduction a transistor 112 coupled between the collector of the transistor 100 at the terminal A and ground. Conduction of the transistor 112 turns off the transistors 100 and 102 within the amplifier A4, with the result that the entire current from the output 48 is applied to the base of the transistor 108. This further biases the transistor 108 into conduction, resulting in a threshold latching action. The latch 92 of FIG. 5 is comprised of the transistors 108 and 112 as well as the transistor 102. This sets the latch 92.

The setting of the latch 92 results in discharge of a capacitor 114 within the one shot 96. Discharge of the capacitor 114 produces the pulse leading edge 98 shown in FIG. 5.

Thus, by making the resistor 106 slightly smaller than the resistor 104, the circuit of FIG. 6 is able to latch in response to equal voltages at the outputs 46 and 48. If the resistors 104 and 106 were equal in value, then the voltage at output 48 would have to become substantially greater than the voltage at the output 46 in order for latching to occur. By making the resistance of the resistor 106 5K ohms smaller than the resistance of the resistor 104, the voltage at terminal B is as much as 0.3–0.4 volts greater than the voltage at terminal A for equal voltages at the outputs 46 and 48, in the present example.

While the invention has been particularly shown and described with reference to a preferred embodiment thereof, it will be understood by those skilled in the art that various changes in form and details may be made therein without departing from the spirit and scope of the invention.

What is claimed is:

1. A motor pulse sensing arrangement comprising the combination of:

a DC permanent magnet motor;

a drive circuit coupled to drive the motor; and means coupled to the motor for continuously sensing motor current to detect commutation pulses continuously produced by the motor, the means for continuously sensing being operative to detect commutation pulses during braking of the motor and including a resistor serially coupled to the motor between the motor and the drive circuit, the resistor forming a junction with the motor at which commutation pulses are produced, and means coupled to the junction for counting commutation pulses to determine position of the motor.

2. The invention set forth in claim 1, wherein the means for continuously sensing is operative to detect commutation pulses of both positive and negative polarity.

3. The invention set forth in claim 1, wherein the means for continuously sensing motor current includes means for excluding the detection of commutation pulses of amplitude below a minimum threshold.

4. The invention set forth in claim 3, wherein the minimum threshold is variable.

5. A motor pulse sensing arrangement comprising the combination of:

a motor for producing periodic commutation pulses representing the position of the motor;

a drive circuit coupled to drive the motor;

means coupled to the motor for continuously sensing the periodic commutation pulses and including a resistor serially coupled to the motor between the motor and the drive circuit, the resistor forming a junction with the motor at which the periodic commutation pulses are produced; and means coupled to the junction for recognizing only sensed periodic commutation pulses having an amplitude above a minimum acceptable level.

6. The invention set forth in claim 5, further including means for counting sensed periodic commutation pulses recognized as having an amplitude above a minimum acceptable level to determine the position of the motor.

7. The invention set forth in claim 5, wherein the means for recognizing includes means for comparing sensed commutation periodic pulses with a threshold value which is adjustable.

8. The invention set forth in claim 5, further including means for recognizing only sensed periodic commutation pulses having a frequency within a predetermined threshold range.

9. The invention set forth in claim 5, wherein the means for continuously sensing is operative to sense periodic commutation pulses of both positive and negative polarity.

10. A motor pulse sensing arrangement comprising the combination of:

a DC permanent magnet motor producing periodic commutation current pulses representing the position of the motor; and means coupled to the motor for sensing the commutation current pulses, and including a resistor serially coupled to the motor and forming a junction therebetween, means coupled to drive the motor through the resistor and means coupled to the junction for recognizing only sensed commutation current pulses having an amplitude above a predetermined acceptable level.

11. The invention set forth in claim 10, wherein the predetermined acceptable level is adjustable.

12. The invention set forth in claim 10, wherein the means for sensing the commutation current pulses includes a balanced differential gain stage, an adjustable differential gain stage coupled to the balanced differential gain stage, and a unity gain comparator coupled to the adjustable differential gain stage.

13. The invention set forth in claim 12, wherein the unity gain comparator has a threshold value which is adjustable.

14. The invention set forth in claim 12, wherein the means for sensing the commutation current pulses includes a differential to single ended convertor coupled to the unity gain comparator and a threshold latch coupled to the differential to single ended convertor.

15. A pulse detection and conditioning circuit comprising the combination of:

a balanced differential gain stage, coupled to receive pulses to be detected and conditioned, the balanced differential gain stage being differentially unbalanced by the receipt of a pulse;

an adjustable differential gain stage coupled to the balanced differential gain stage and being differentially unbalanced by differential unbalancing of the balanced differential gain stage and in a ratio which is adjustable; and a unity gain comparator coupled to the adjustable differential gain stage and operative to compare differential unbalancing of the adjustable differential gain stage with a threshold value.

16. The invention set forth in claim 15, wherein the balanced differential gain stage comprises a first differential amplifier having a first pair of transistors normally biased in balanced fashion, one of the first pair of transistors also being coupled to be biased by a received pulse, and the adjustable differential gain stage comprises a second differential amplifier having a second pair of transistors coupled to be biased by levels of conduction in the first pair of transistors and coupled through an adjustable gain circuit.

17. The invention set forth in claim 16, wherein the unity gain comparator comprises means for providing a threshold value, and a third pair of transistors, each coupled to a different one of the second pair of transistors to compare the states of conduction of the second pair of transistors with the threshold value.

18. The invention set forth in claim 15, wherein the balanced differential gain stage has an input coupled to receive pulses to be detected and conditioned through a capacitor providing high pass filtering, the balanced differential gain stage further having a coupling resistor coupled thereto to receive pulses to be detected and conditioned.

19. The invention set forth in claim 18, further including a DC permanent magnet motor, a sense resistor serially coupled to the motor through a junction coupled to the capacitor and to the reference resistor, a motor drive circuit coupled across the serial combination of the motor and the sense resistor, and a second capacitor serially coupled across the motor and providing low pass filtering.

20. The invention set forth in claim 15, further including a differential to single ended converter for producing a single signal in accordance with relative values of a pair of outputs of the unity gain comparator, and a threshold latch for changing state when the single signal reaches a threshold value to initiate generation of a pulse.

21. The invention set forth in claim 20, wherein the differential to single ended converter comprises first and second transistors coupled through resistors of different value to receive the pair of outputs of the unity gain comparator and coupled to conduct like currents therethrough, one of the resistors of different value which has a lesser value than the other being coupled to the threshold latch.

22. The invention set forth in claim 21, wherein the threshold latch includes third and fourth transistors coupled to be biased into conduction by a signal of at least predetermined threshold value provided by the one of the resistors of different value, a fifth transistor coupled to be biased into conduction by conduction of the third and fourth transistors, the fifth transistor rendering the first and second transistors non-conductive when biased into conduction, and a capacitor coupled in parallel with the fourth transistor and operative to discharge and initiate the generation of a pulse when the fourth transistor is biased into conduction.

23. Apparatus for sensing commutation pulses produced by an electric motor coupled to receive a drive signal from a motor drive circuit, the apparatus comprising:

a sensing resistor coupled in series with the motor, between the motor drive circuit and the motor;

a motor current sensor coupled to an electrical junction located between the sensing resistor and the motor.

24. Apparatus as recited in claim 23, wherein the motor drive current signal includes commutation pulses and wherein said motor current sensor comprises a commutation pulse sensor and counter for sensing and counting commutation pulses of the motor drive current signal at said node.

25. Apparatus for tracking the rotational position of an electric motor having a driving mode and a braking mode and coupled to receive a drive signal from a motor drive circuit through a sensing resistor electrically coupled in series with the motor, and through an electrical junction located between the motor and the sensing resistor, the drive signal having commutation pulses produced during said driving mode and during said braking mode, the apparatus comprising:

a commutation pulse sensing and shaping circuit adapted to sense and shape driving mode and braking mode commutation pulses at said electrical junction; and a reference signal terminal at which a reference signal is provided for comparison with sensed and shaped commutation pulses.

26. Apparatus as recited in claim 25, further comprising a pulse counter electrically coupled to count commutation pulses sensed and shaped by said commutation pulse sensing and shaping circuit, wherein the count of the pulse counter is representative of the rotational position of said motor.

27. Apparatus as recited in claim 25, wherein said driving mode commutation pulses are of opposite polarity relative to said braking mode commutation pulses.

28. Apparatus for tracking the rotational position of an electric motor coupled to a motor drive circuit through a sensing resistor and through an electrical junction located between the motor and the sensing resistor, wherein a motor drive signal is provided between the motor drive circuit and the motor, the drive signal having positive and negative polarity commutation pulses, the apparatus comprising:

a first differential amplifier having a differential input and having a balanced state, said first differential amplifier being electrically coupled to said electrical junction such that the balanced first differential amplifier becomes unbalanced by the presence of each commutation pulse at said electrical terminal; and a second differential amplifier coupled to the first differential amplifier and having a pair of output leads, the second differential amplifier providing a bias signal on one of said output leads upon the first differential amplifier becoming unbalanced by a positive polarity commutation pulse and providing a bias signal on the other of said output leads upon the first differential amplifier becoming unbalanced by a negative polarity commutation pulse;

a transistor circuit having an output and at least one bias input for controlling the signal amplitude at the output, the transistor circuit being coupled at the bias input to at least one of said output leads of said second differential amplifier such that a negative polarity commutation pulse results in the biasing of the transistor circuit and a positive polarity commutation pulse results in a different biasing of the transistor circuit; and an output terminal coupled to the output of the transistor circuit, the output terminal providing an output signal having an amplitude dependent upon the amplitude of the bias signals applied to the bias input.

29. Apparatus as recited in claim 28, wherein:

said transistor circuit comprises a pair of transistors each having an output, each transistor further having a bias input for controlling the signal amplitude at its output, each transistor being coupled at its bias input to a respective one of said output leads of said second differential amplifier such that a negative polarity commutation pulse results in the biasing of one of said transistors and a positive polarity commutation pulse results in the biasing of the other of said transistors; and said output terminal is coupled to the output of each of said transistors, the output terminal providing an output signal having an amplitude dependent upon the amplitude of the bias signals applied to the bias inputs of said transistors.

30. Apparatus for tracking the rotational position of an electric motor coupled to a motor drive circuit through a sensing resistor coupled in series with the motor, and through an electrical junction located between the motor and the sensing resistor, wherein a motor drive signal is provided between the motor drive circuit and the motor, the drive signal having positive and negative polarity commutation pulses, the apparatus comprising:

a first differential amplifier having a differential input and being in a balanced state when the differential input is below a threshold, said first differential amplifier being electrically coupled to said electrical terminal such that the balanced first differential amplifier becomes unbalanced by the presence of a positive polarity or negative polarity commutation pulse at said electrical terminal; and a second differential amplifier coupled to the first differential amplifier and having first and second output leads, said second differential amplifier providing a bias voltage on said first output lead upon the first differential amplifier becoming unbalanced by a positive polarity commutation pulse, said bias voltage having an amplitude dependent upon the amplitude of said positive polarity commutation pulse, said second differential amplifier providing a second bias voltage on said second output lead upon the first differential amplifier becoming unbalanced by a negative polarity commutation pulse, said second bias voltage having an amplitude dependent upon the amplitude of said negative polarity commutation pulse;

a first transistor, having a base coupled to said first output lead, for providing an output signal having an amplitude dependent upon the amplitude of the first bias voltage;

a second transistor, having a base coupled to said second output lead, for providing an output signal having an amplitude dependent upon the amplitude of the second bias voltage; and a common output terminal responsive to said first and second transistors to provide said output signals of said first and second transistors.

31. Apparatus for tracking the rotational position of an electric motor coupled to a motor drive circuit through a sensing resistor coupled in series with the motor, and through an electrical junction located between the motor and the sensing resistor, wherein a motor drive signal is provided between the motor drive circuit and the motor, the drive signal having positive and negative polarity commutation pulses, the apparatus comprising:

a positive and negative polarity commutation pulse sensing circuit adapted to sense positive and negative polarity commutation pulses at said electrical junction; and a reference signal terminal at which a reference signal is provided for comparison with sensed commutation pulses.

32. Apparatus as recited in claim 31, wherein said positive and negative polarity commutation pulse sensing circuit comprises a first differential amplifier biased in a balanced state, said first differential amplifier being electrically coupled to said electrical junction such that the balanced first differential amplifier becomes unbalanced by the presence of a positive polarity or negative polarity commutation pulse at said electrical terminal.

33. Apparatus as recited in claim 32, wherein said positive and negative polarity commutation pulse sensing and shaping circuit further comprises:

a second differential amplifier coupled to the first differential amplifier and having first and second output leads;

wherein said second differential amplifier provides a bias voltage on said first output lead upon the first differential amplifier becoming unbalanced by a positive polarity commutation pulse, said bias voltage having an amplitude dependent upon the amplitude of said positive polarity commutation pulse; and wherein said second differential amplifier provides a second bias voltage on said second output lead upon the first differential amplifier becoming unbalanced by a negative polarity commutation pulse, said second bias voltage having an amplitude dependent upon the amplitude of said negative polarity commutation pulse.

34. Apparatus as recited in claim 33, wherein said positive and negative polarity commutation pulse sensing and shaping circuit further comprises:

a first transistor, having a base coupled to said first output lead, for providing an output signal having an amplitude dependent upon the amplitude of the first bias voltage;

a second transistor, having a base coupled to said second output lead, for providing an output signal having an amplitude dependent upon the amplitude of the second bias voltage; and a common output terminal coupled to said first and second transistors to provide said output signals of said first and second transistors.

35. Apparatus for tracking the rotational position of an electric motor coupled to receive a drive signal from a motor drive circuit, the drive signal having commutation pulses, the apparatus comprising:

a sensing resistor electrically coupled between the motor and the motor drive circuit, in series with the motor and through an electrical junction located between the sensing resistor and the motor;

a commutation pulse sensing and shaping circuit electrically coupled to sense and shape commutation pulses at said electrical junction; and a pulse counter electrically coupled to count commutation pulses sensed and shaped by said commutation pulse sensing and shaping circuit;

wherein the count of the pulse counter is representative of the rotational position of said motor.

36. Apparatus as recited in claim 35, further comprising a drive control circuit electrically coupled to said motor drive circuit and said pulse counter, to provide a control signal to said motor drive circuit dependent upon the count of said pulse counter.

37. Apparatus as recited in claim 35, wherein said commutation pulse sensing and shaping circuit is operative to sense and shape commutation pulses of both positive and negative polarity.

38. Apparatus as recited in claim 37, wherein said commutation pulse sensing and shaping circuit comprises:

a first differential amplifier biased into a balanced state, said first differential amplifier having an input electrically coupled to said electrical terminal such that the balanced first differential amplifier becomes unbalanced by the presence of each commutation pulse at said electrical terminal; and a second differential amplifier coupled to the first differential amplifier and having a pair of output leads, the second differential amplifier providing a bias signal on one of said output leads upon the first differential amplifier becoming unbalanced by a positive polarity commutation pulse and providing a bias signal on the other of said output leads upon the first differential amplifier becoming unbalanced by a negative polarity commutation pulse;

a pair of transistors each having an output, each transistor further having a bias input for controlling the signal amplitude at its output, each transistor being coupled at its bias input to a respective one of said output leads of said second differential amplifier such that a negative polarity commutation pulse results in the biasing of one of said transistors and a positive polarity commutation pulse results in the biasing of the other of said transistors; and an output terminal coupled to the output of each of said transistors, the output terminal providing an output signal having an amplitude dependent upon the amplitude of the bias signals applied to the bias inputs of said transistors.

39. Apparatus as recited in claim 37, wherein said commutation pulse sensing and shaping circuit comprises:

a first differential amplifier biased into a balanced state, said first differential amplifier having an input electrically coupled to said electrical terminal such that the balanced first differential amplifier becomes unbalanced by the presence of a positive polarity or negative polarity commutation pulse at said electrical terminal; and a second differential amplifier coupled to the first differential amplifier and having first and second output leads, said second differential amplifier providing a bias voltage on said first output lead upon the first differential amplifier becoming unbalanced by a positive polarity commutation pulse, said bias voltage having an amplitude dependent upon the amplitude of said positive polarity commutation pulse, said second differential amplifier providing a second bias voltage on said second output lead upon the first differential amplifier becoming unbalanced by a negative polarity commutation pulse, said second bias voltage having an amplitude dependent upon the amplitude of said negative polarity commutation pulse;

a first transistor having a base coupled to said first output lead and for providing an output signal having an amplitude dependent upon the amplitude of the first bias voltage;

a second transistor having a base coupled to said second output lead for providing an output signal having an amplitude dependent upon the amplitude of the second bias voltage; and a common output terminal coupled to said first and second transistors to provide said output signals of said first and second transistors.

40. Apparatus for tracking the rotational position of an electric motor coupled to receive a drive signal from a motor drive circuit, the drive signal having commutation pulses, the apparatus comprising:

a sensing resistor electrically coupled between the motor and the motor drive circuit, in series with the motor and through an electrical junction located between the sensing resistor and the motor;

a commutation pulse sensing and shaping circuit electrically coupled to said electrical junction; and a pulse counter electrically coupled to said commutation pulse sensing and shaping circuit;

wherein upon providing a drive signal to said motor, through said electrical junction, commutation pulses in the motor drive signal at said electrical junction are sensed and shaped by said commutation pulse sensing and shaping circuit, the sensed and shaped pulses are counted by said pulse counter and the count is representative of the rotational position of said motor.

41. Apparatus as recited in claim 40, further comprising a drive control circuit electrically coupled to said motor drive circuit and said pulse counter, to provide a control signal to said motor drive circuit dependent upon the count of said pulse counter.

42. Apparatus for tracking and controlling the rotational position of an electric motor that is coupled to receive a drive signal from a motor drive circuit, the drive signal having commutation pulses, the apparatus comprising:

a sensing resistor electrically coupled between the motor and the motor drive circuit, in series with the motor and through an electrical junction located between the sensing resistor and the motor;

a commutation pulse sensing and shaping circuit electrically coupled to said electrical junction;

a pulse counter electrically coupled to said commutation pulse sensing and shaping circuit; and a drive control circuit electrically coupled with said pulse counter and said motor drive circuit;

wherein upon providing a drive signal to said motor, through said electrical junction, commutation pulses in the motor drive signal at said electrical junction are sensed and shaped by said commutation pulse sensing and shaping circuit, the sensed and shaped pulses are counted by said pulse counter and a drive signal is provided to said motor drive circuit by said drive control circuit in response to the pulse count of said pulse counter.

43. A method for tracking the rotational position of an electric motor electrically coupled to receive a motor drive signal from a motor drive circuit, the motor drive signal having commutation pulses, the method comprising the steps of:

electrically coupling a sensing resistor in series with the motor through an electrical terminal between the sensing resistor and the motor;

sensing and shaping commutation pulses of the motor drive signal at said electrical terminal; and counting sensed and shaped commutation pulses, wherein the pulse count is representative of the rotational position of said motor.

44. A method as recited in claim 43, wherein said step of sensing and shaping commutation pulses comprises the steps of:

biasing a differential gain amplifier into a balanced state;

electrically coupling an input of said balanced differential gain amplifier to said electrical terminal such that the balanced differential gain amplifier becomes unbalanced by the presence of each commutation pulse at said electrical terminal; and producing an output signal that traverses a predefined reference level upon said balanced differential gain amplifier becoming unbalanced.

45. A method as recited in claim 43, wherein said motor drive signal has both positive and negative polarity commutation pulses and wherein said step of sensing and shaping commutation pulses comprises the steps of:

biasing a differential gain amplifier into a balanced state;

electrically coupling an input of said balanced differential gain amplifier to said electrical terminal such that the balanced differential gain amplifier becomes unbalanced by the presence of each positive polarity commutation pulse and each negative polarity commutation pulse at said electrical terminal; and producing an output signal that traverses a predefined reference level upon said balanced differential gain amplifier becoming unbalanced as a result of a positive or negative polarity commutation pulse at said electrical terminal.

46. A method as recited in claim 43, wherein said motor drive signal has both positive and negative polarity commutation pulses and wherein said step of sensing and shaping commutation pulses comprises the steps of sensing and shaping both positive and negative polarity commutation pulses.

47. A method for tracking the rotational position of an electric motor electrically coupled to receive a motor drive signal from a motor drive circuit, the motor drive signal having commutation pulses, the method comprising the steps of:

biasing a differential gain amplifier into a balanced state;

electrically coupling an input of said balanced differential gain amplifier between the motor drive circuit and the electric motor such that the balanced differential gain amplifier becomes unbalanced by the presence of each commutation pulse at said electrical terminal; and producing an output signal that traverses a predefined reference level upon said balanced differential gain amplifier becoming unbalanced.

48. A method as recited in claim 47, further comprising the step of electrically coupling a sensing resistor in series with the motor through an electrical terminal between the sensing resistor and the motor, wherein said step of electrically coupling the input of said balanced differential gain amplifier comprises coupling said input to said electrical terminal.

49. A method as recited in claim 47, further comprising the step of counting the number of instances in which the output signal traverses the predefined reference level.

50. A method of making an apparatus for tracking the rotational position of an electric motor coupled to a motor drive circuit through a sensing resistor coupled in series with the motor, and through an electrical junction located between the motor and the sensing resistor, wherein a motor drive signal is provided between the motor drive circuit and the motor, the drive signal having first and second commutation pulses of opposite polarity, the method comprising the steps of:

electrically coupling a sensing resistor between the motor and the motor drive circuit, in series with the motor and through an electrical junction located between the sensing resistor and the motor; and electrically coupling a commutation pulse sensing and shaping circuit to sense and shape first and second commutation pulses at said electrical junction.

51. A method as recited in claim 50, further comprising the step of electrically coupling a pulse counter to count commutation pulses sensed and shaped by said commutation pulse sensing and shaping circuit, wherein the count of the pulse counter is representative of the rotational position of said motor.

52. A method as recited in claim 50, further comprising the step of electrically coupling a drive control circuit to said motor drive circuit and said pulse counter, to provide a control signal to said motor drive circuit dependent upon the count of said pulse counter.

53. A method as recited in claim 50, further comprising the steps of:

electrically coupling said sensing resistor in series with said motor; and electrically coupling said electric motor to said motor drive circuit through said sensing resistor.

54. An apparatus for comparing a signal to a reference level, the apparatus comprising:

a first transistor having an input and a first and a second outputs;

a second transistor having an input and a first and a second outputs, the first outputs of the first and second transistors being coupled to each other, and the second outputs of the first and second transistors being coupled to each other;

a first device output coupled to the second outputs of the first and second transistors;

a second device output;

a third transistor having an input and an output, and being coupled to provide at its output the reference level for coupling to the second device output.

* * * * *